United States Patent [19]

Shiraishi

[11] Patent Number: 5,060,283
[45] Date of Patent: Oct. 22, 1991

[54] METHOD AND SYSTEM FOR READING IMAGES WITH A MOVABLE LIGHT INTERCEPTING PLATE

[75] Inventor: Atsushi Shiraishi, Kaisei, Japan

[73] Assignee: Fuji Photo Film Co., Ltd., Kanagawa, Japan

[21] Appl. No.: 509,844

[22] Filed: Apr. 17, 1990

[30] Foreign Application Priority Data

Apr. 20, 1989 [JP] Japan .................................. 1-101108
Apr. 20, 1989 [JP] Japan .................................. 101109

[51] Int. Cl.⁵ .......................... G06K 9/42; H01J 3/14; G02B 15/00; G01J 1/40
[52] U.S. Cl. ........................................ 382/47; 382/1; 382/65; 250/237 R; 356/233; 355/55; 359/232; 359/227; 359/683
[58] Field of Search ............ 250/237 R, 237 G, 208.1, 250/229; 350/427, 271, 266; 355/55; 356/233; 382/65, 67, 47, 1

[56] References Cited

U.S. PATENT DOCUMENTS

| 4,341,459 | 7/1982 | Sugiura et al. | 355/60 |
| 4,474,460 | 10/1984 | Suzuki | 355/55 |
| 4,894,682 | 1/1990 | Kondo et al. | 355/55 |

OTHER PUBLICATIONS

Oriel Corporation "Optics and Fiters" Catalog vol. III.

Primary Examiner—David K. Moore
Assistant Examiner—Michael Cammarata
Attorney, Agent, or Firm—Sughrue, Mion, Zinn, Macpeak & Seas

[57] ABSTRACT

An image reading method and apparatus includes detecting an optimal position of a slot of a light intercepting plate by reading an output level from a light sensor which receives light passing through the slit, moving the light intercepting plate to an optimal slit position in accordance with the read output level, and correcting any deviations in a scanning direction based on the amount the light intercepting plate is moved.

20 Claims, 12 Drawing Sheets

PRIOR ART
FIG.1

4 PHOTOELECTRIC CONVERSION ELEMENT

PRIOR ART

FIG. 4

PRIOR ART

PRIOR ART

METHOD AND SYSTEM FOR READING IMAGES WITH A MOVABLE LIGHT INTERCEPTING PLATE

BACKGROUND OF THE INVENTION

The present invention relates to a method and an apparatus for reading images by flat-bed scanning with an image sensor, and also to a slit positioning apparatus for use in an image reading apparatus.

Image lights incident on the light receiving plane of a photo-electric conversion element such as CCD that constitutes an image sensor such as a linear sensor include, in addition to those (hereinafter referred to as "direct incident light") directly incident thereon, those lights (hereinafter referred to as "flare light") which enter the light receiving plane after having been reflected from a masking surface provided within a optical window glass or near the light receiving plane of the photoelectric conversion element for protecting the element. Since the flare light enters the light receiving plane of the photoelectric conversion element at a location different from the location the image light is expected to enter, it adversely affects the obtained image.

Figure 1:
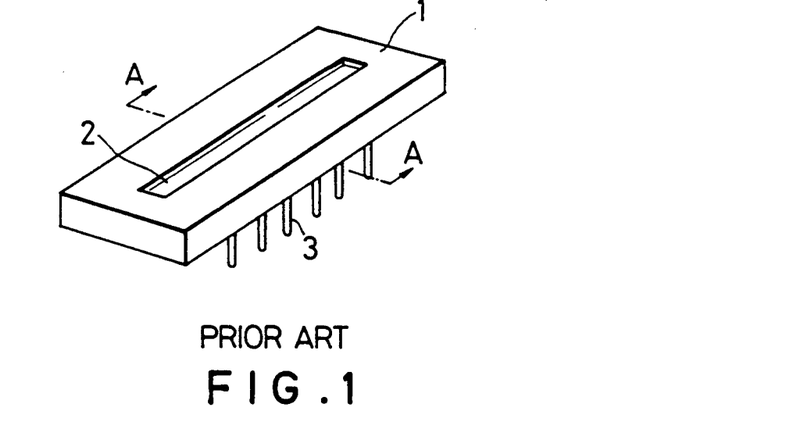
FIG. 1 is a perspective schematic view showing an example of the prior art linear sensor.
Figure 2:
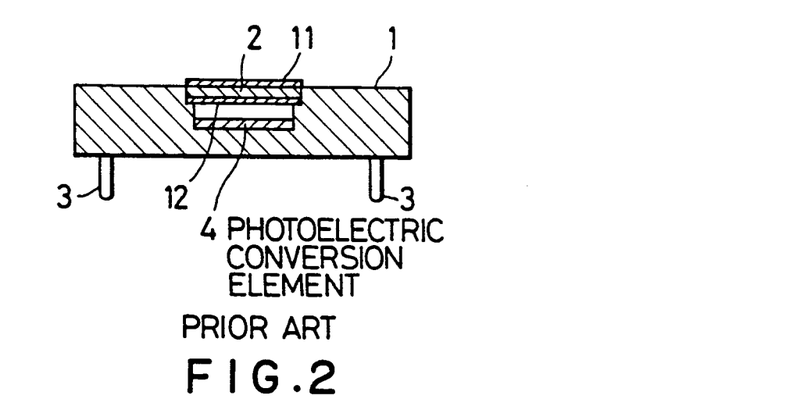
FIG. 2 is a section along the line A—A of FIG. 1.

The applicant of the present invention therefore developed a linear sensor described below in order to prevent the adverse effects of the above flare light. FIG. 1 is a perspective schematic view showing one embodiment of a linear sensor. FIG. 2 is a section thereof along the line A—A. The linear sensor comprises a casing 1, a photoelectric conversion element 4, an optical window glass 2 which contains an inert gas and which is attached to the casing 1 above the light receiving plane of the photoelectric conversion element 4 to protect and seal the same against damages and deterioration otherwise caused by dust or air. The top and the back surfaces of the optical window glass 2 are coated with protective films (e.g. of $MgF_2$, $SiO_2$) 11, 12 to prevent reflection of the image lights. Having thus reduced the flaring by the optical window glass 2, the image lights are converted into electrical signals by the photoelectric conversion element 4, and outputted outside by means of lead pins 3. The resultant images are of an excellent quality (refer to Japanese Utility Model Application No. 71798/1987 Laid-open No. 180948/1988)).

Figure 3:
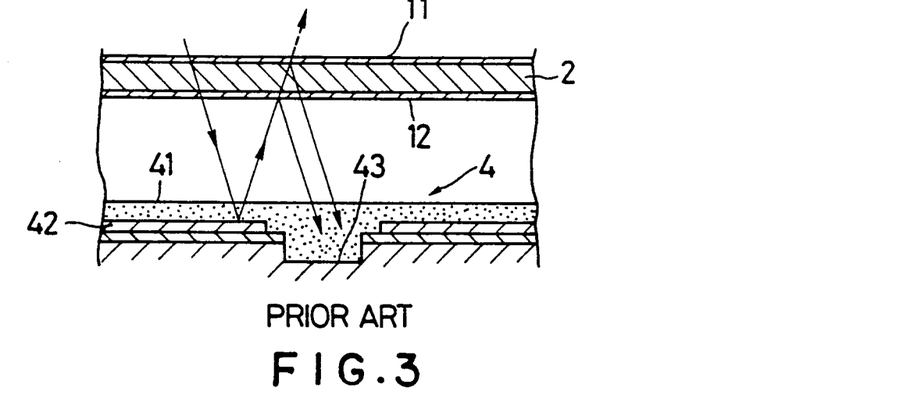
FIG. 3 is a sectional view of the prior art linear sensor used to explain the problems thereof.

The above linear sensor with an optical glasss window that is coated with films for preventing reflection is capable of reducing flaring of the image lights to a certain degree, but it had its limits. For example, as shown in FIG. 3, a portion of light which is reflected by the mask 42 (such as aluminum deposited layer for intercepting light) at the light receiving section after having penetrated the optical window glass 2 and the protection layer 41 (e.g. of $SiO_2$) of the photoelectric conversion element 4 is often reflected once again by the protective films 11 and 12 of the optical window glass 2.

Figure 4:
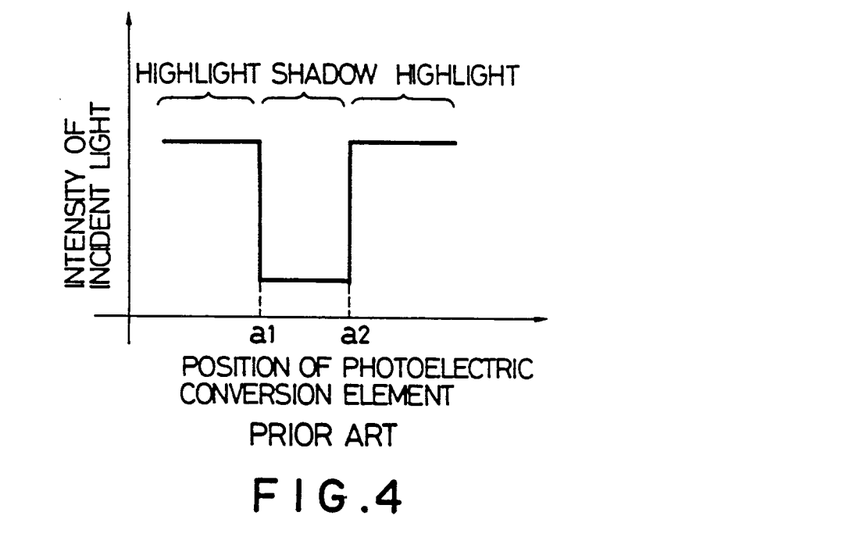
Fig. 4 is a graph showing the intensity of the incident image light.
Figure 5:
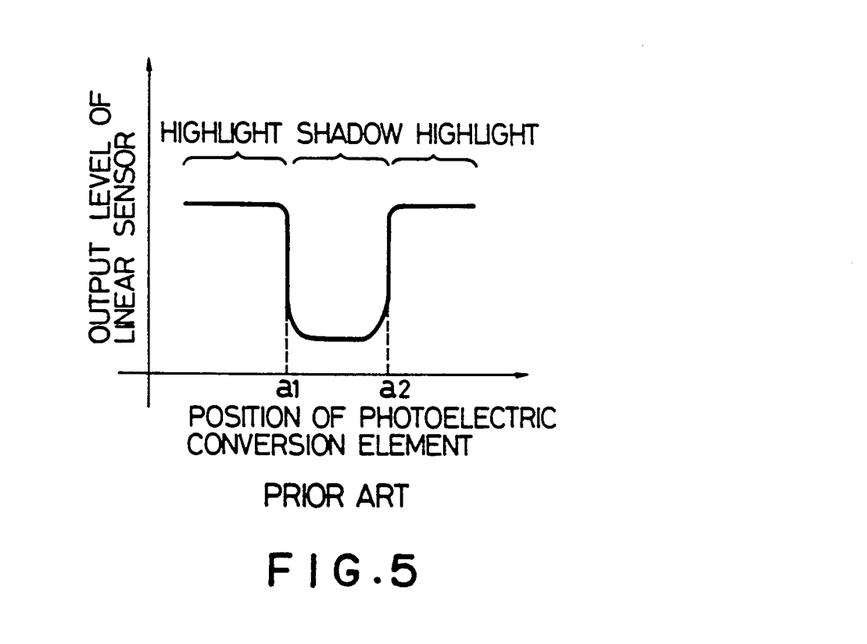
FIG. 5 is a graph showing the level of output signals from the prior art linear sensor.

Therefore, when incident lights having the grey level distribution as shown in FIG. 4 enter the light receiving plane, displacements in terms of entering points are emphasized at the borders between the shadows and highlights. As a result, the levels of output electric signals from the photoelectric conversion element will be as shown in FIG. 5. In other words, the light in the highlight is reflected and enters the light receiving plane of the photoelectric conversion element which is provided to detect the shadows, blurring the changes in density or the borders between the highlight and the shadow because of indistinct grey levels. In an apparatus which is required to read and reproduce/record images in multilevels of gradation, the reproduced images tend to be less contrasting and more ambigous if the grey levels at the borders between the shadow and highlights are converted as they are into electric signals.

Figure 6:
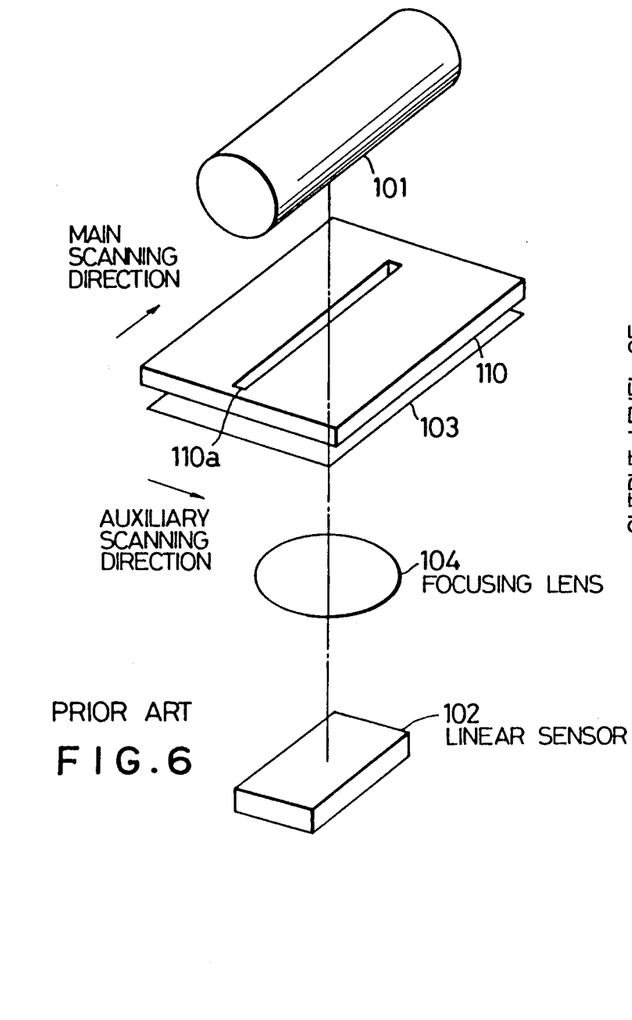
FIG. 6 is a perspective schematic view of the prior art input optical system.

The applicant of the present invention then developed another image reader to solve the problems mentioned above. FIG. 6 is a perspective schematic view of an embodiment to show the optical input system of the image reader. A light intercepting plate 110 is provided between a lighting source 101 (e.g. a fluorescent lamp, a rod halogen lamp) and a transmissive subject copy original (e.g. color reversal film) 103 at a predetermined position. The light intercepeting plate 110 has a slit 110a of a predetermined width so that the light emitted from the lighting source 101 enters the light receiving plane of a linear sensor 102 as a fine strip of light in the main scanning direction. The light intercepting plate 110 is painted or printed with a black mat coating material (such as Sunday Paint (Trade Mark) by Dainippon Toryo Kabushiki Kaisha in Japan) to absorb the light from the lighting source 101 irradiating on the portions other than the slit 110a. A strip of light coming through the slit 110 a in the main scanning direction is transmitted through the transmissive original 103 as the image light. The image light enters the light receiving plane of the linear sensor 102 via a focusing lens 104. Since unnecessary light from the lighting source is intercepted by the light intercepting plate 110, the flare light in a substantial amount can be reduced. By sequentially moving the transmissive original 103 in the auxiliary scanning direction, the entire image can be read out.

Figure 7:
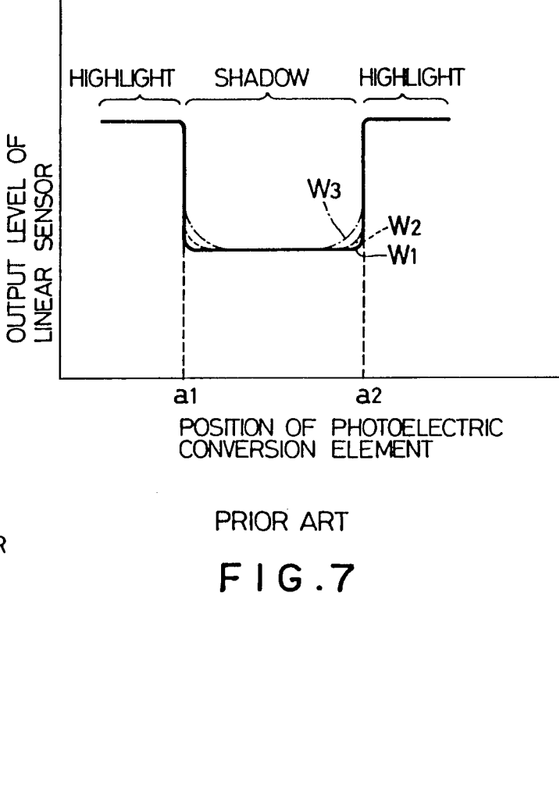
FIG. 7 is a graph showing the output signal level from the linear sensor with slits of different width.
Figure 8A:
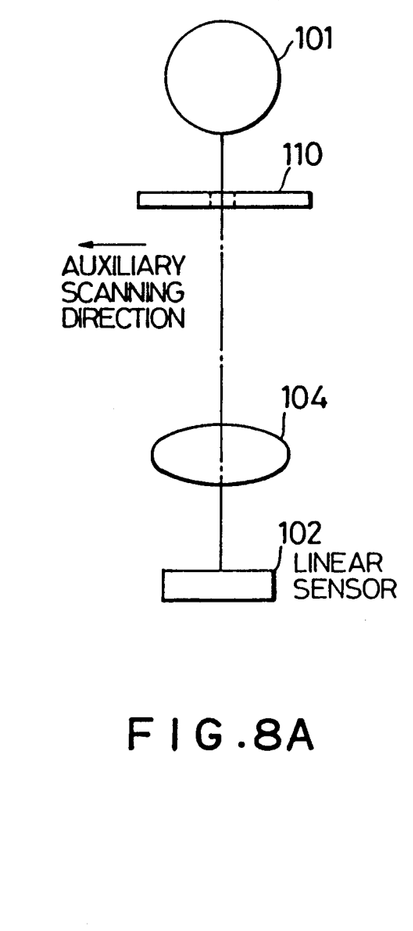
FIGS. 8A to 8C and FIGS. 9A to 9C are views for explaining deviations of the optical axis when the magnification is varied, respectively.
Figure 8B:
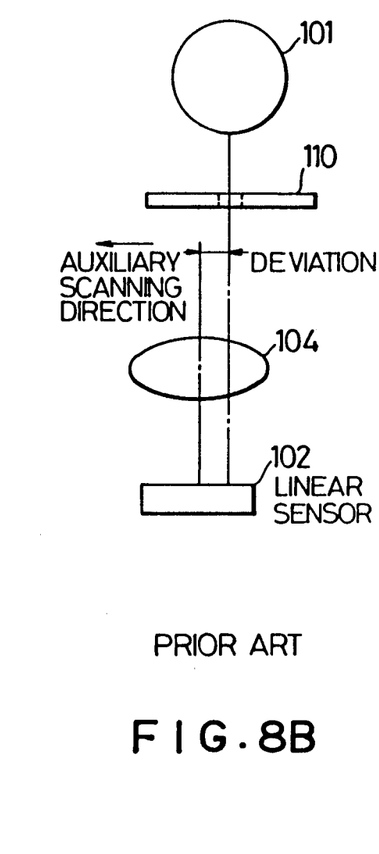
Figure 8C:
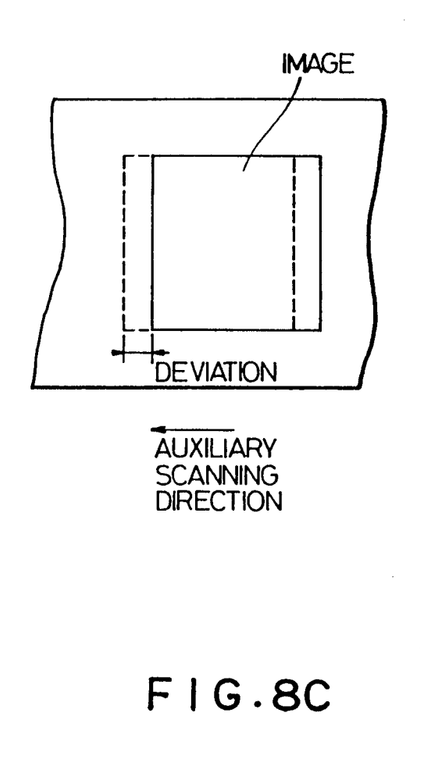
Figure 9A:
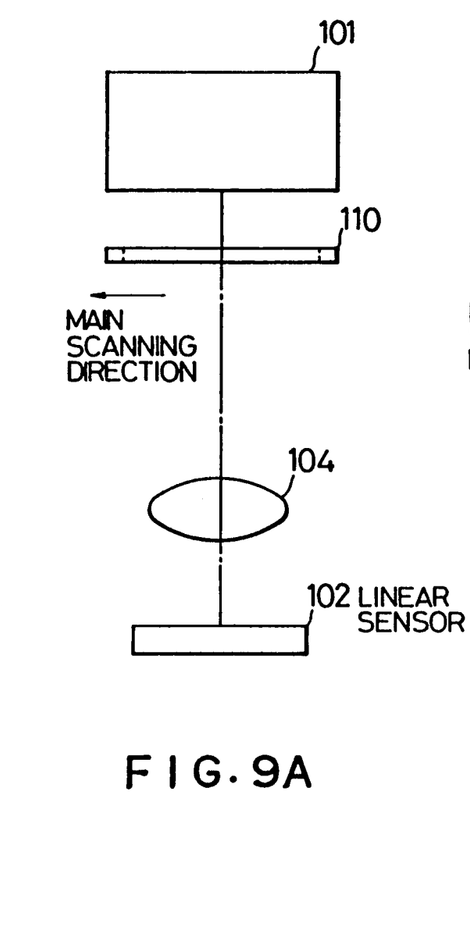
Figure 9B:
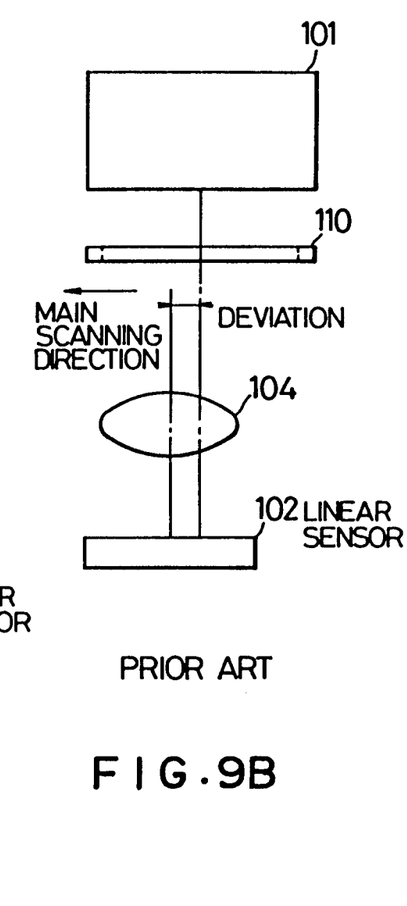
Figure 9C:
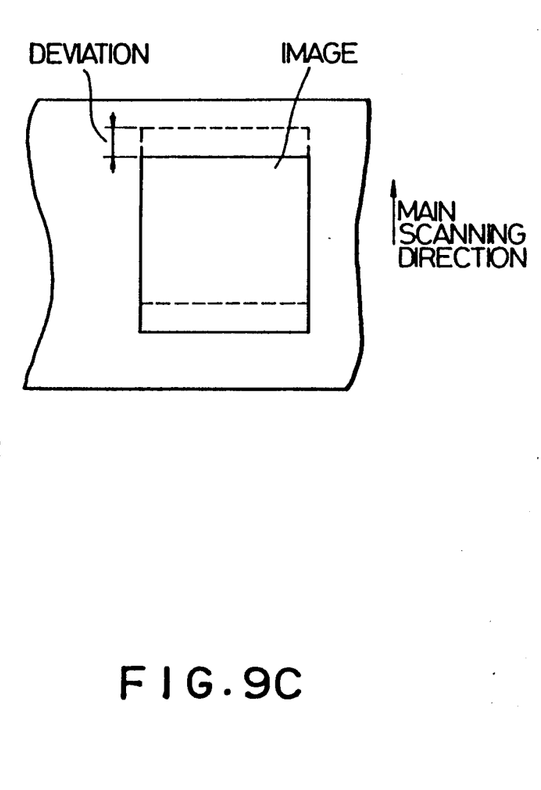

The image reader as mentioned above can produce images with good contrasts when incorporated in a system for obtaining images if the magnification is fixed. However, in a system in which at least two of the linear sensor, focusing lens and transmissive original are movable in the direction of optical axis to vary the optical magnifications, deviations in terms of the optical axis tend to occur when such components are moved. For example, when after the system is arranged as shown in FIG. 8A, the linear sensor 102 and the focusing lens 104 are moved to change the optical magnification, a displacement would occur in the auxiliary scanning direction (FIG. 8B). If this happens, the resultant image as shown by the dotted line in FIG. 8C is deviated from the position of the image that is obtained when there is no displacement in the optical axis (solid line). Similar deviations occur when displacement of the optical axis in the main scanning direction is observed (FIGS. 9A, 9B and 9C). Further, since the width of the strip of light incident in the linear sensor also varies depending on the optical magnification, the width of the slit in the above mentioned image reader must be varied correspondingly to the optical magnification. FIG. 7 shows changes in the level of electric signals at the borders between the shadow and the highlight when the slit width is varied ($W_3 > W_2 > W_1$) at a given optical magnification. The prior art image reader was defective in that if the slit width is not adequate to the optical magnification, the resultant image lacked contrast and became quite blurred.

SUMMARY OF THE INVENTION

The present invention was developed to eliminate the problems mentioned in the foregoing and aims at providing a method and a system for reading images capable of preventing displacements of the optical axis in a main scanning and an auxiliary directions or decrease in contrasts in the grey levels due to flaring of the light into the shadow at the peripheral edge where the grey levels vary significantly even when incorporated in a system where at least two of the linear sensor, the focusing lens and the transmissive original are movable in the direction of optical axis for changing the optical magnification.

According to one aspect of the present invention, for achieving the objects described above, there is provided a method for reading an image which comprises the steps of: determining an optimal position of a slit moving in an auxiliary scanning direction based on values detected by a reading means which reads an image light that comes through said slit, positioning said slit at the optimal position thus determined, and correcting the deviation in the auxiliary scanning direction based on the amount the slit is displaced to reach said optimal position.

According to another aspect of the present invention, there is provided a method for reading an image which comprises the steps of: determining an optimal position of a slit moving in an auxiliary scanning direction based on values detected by a reading means which reads an image light that comes through said slit; positioning said slit at the optimal position, reading a pixel number in said reading means that corresponds to a reference center position; and correcting a deviation in a main scanning direction normal to said auxiliary scanning direction based on the pixel number thus read.

Further, according to still another aspect of the present invention, there is provided an apparatus for reading an image comprising a slit which passes an image light in a thin strip, moving a means which moves said slit in the auxiliary scanning direction; a control means which controls driving of said means to move the slit, determines an optimal position of the slit based on values detected by a means to read image light that comes through said moving slit, positions the slit at the optimal position, corrects a deviation in the auxiliary scanning direction based on the amount the slit is moved to reach the optimal position and/or reads out a pixel number of said reading means that corresponds to the reference center position to correct the deviation in the main scanning direction normal to said auxiliary scanning direction based on the pixel number thus read.

Still further, according to another aspect of the present invention, there is provided a slit positioning apparatus comprising a slit which passes an image light in a thin strip; moving means which moves said slit in a longitudinal direction thereof and a perpendicular direction to the image light; and a control means which controls driving of said slit moving means, determines an optimal position of the slit based on detected values of the image light that comes through said moving light and positions the slit a the optimal position.

The nature, principle and utility of the invention will become more apparent from the following detailed description when read in conjunction with the accompanying drawings.

DESCRIPTION OF THE PREFERRED EMBODIMENTS

Figure 10:
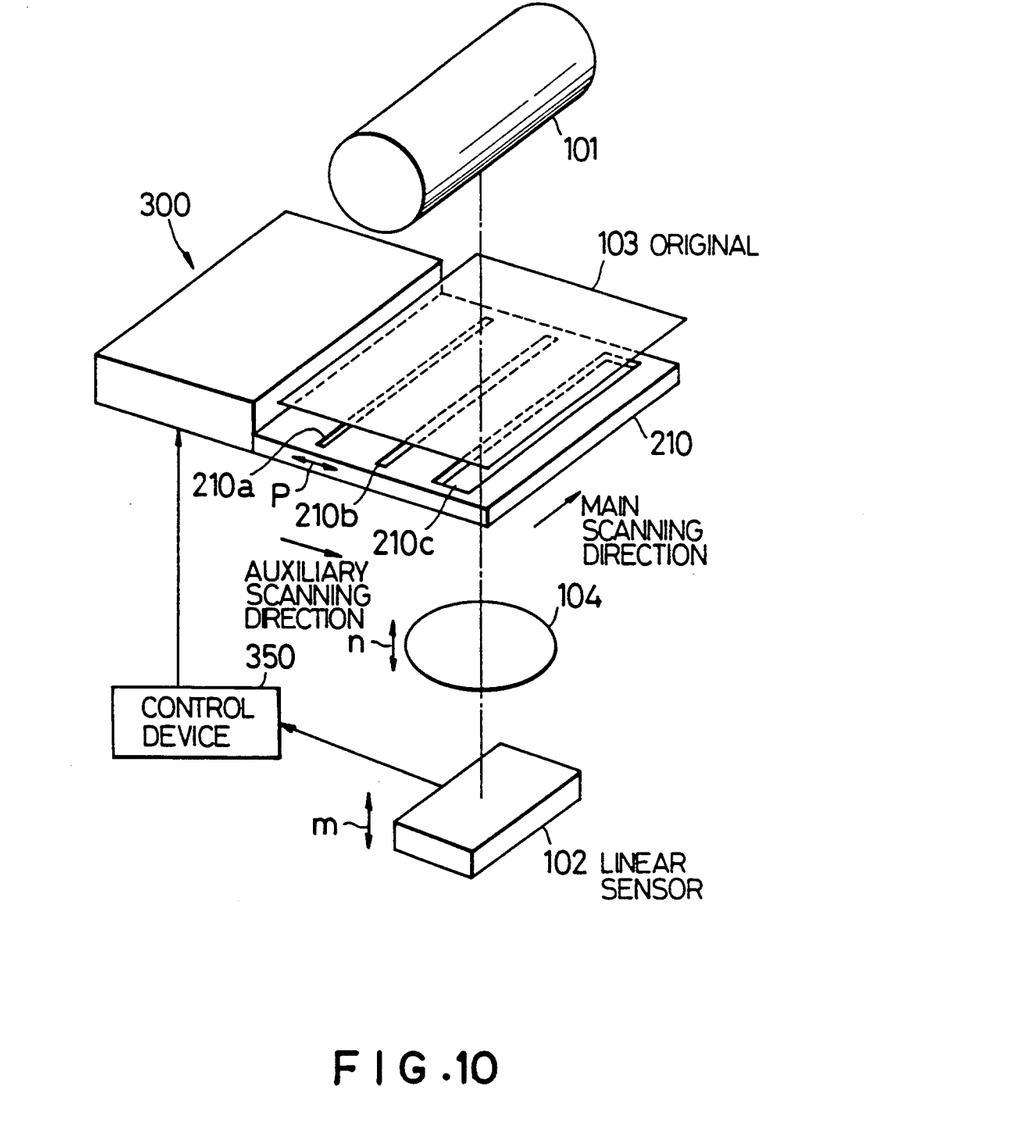
FIG. 10 is a perspective schematic view showing an embodiment of the input optical system in the image reading apparatus according to the present invention.

FIG. 10 corresponds to FIG. 6 and is a perspective schematic view showing one embodiment of an input optical system according to the invention. The same component parts in FIGS. 10 and 6 are denoted with the same reference numbers and duplicate descriptions are omitted for brevity sake. Instead of the light intercepting plate 110 of the prior art, a novel light intercepting plate 210. The light intercepting plate 210 has slits 210a, 210b and 210c which have different widths respectively, and are capable of moving in the direction of the arrow p shown in the figure by means of a slit moving mechanism 300. The light intercepting plate is disposed below the transmissive original 103 so that the original 103 is positioned as near as the light source 101 as possible, thereby ensuring sufficient light for forming the image. This arrangement also allows for sufficient space between original 103 and focusing lens 104. The light intercepting plate 210 is coated with a black mat coating material (e.g. Sunday Paint by Dainippon Toryo K.K.) on its surfaces. A control device 350 is provided, which controls driving of the slit moving mechanism 300, determines the optimal position of the slit 210a, 210b or 210c based on the detected values of the image forming light incident on the linear sensor 102 via the moving slit 210a, 210b or 210c, and corrects deviations in the positions for starting and ending reading of the transmissive original 103 with respect to the auxiliary scanning and main scanning direction. Thus, if the optical magnification of the image is varied by moving the linear sensor 102 and the focusing lens 104 in the directions marked with arrows m and n, the slit moving mechanism 300 is driven in accordance with the command from the control device 300 to move the light intercepting plate 210 in the direction of arrow p, whereby any one of the slits with the slit width optimal for the optical magnification currently established may be positioned along the optical axis and the original is read through the slit. In this manner, the resultant image becomes very clear.

Figure 11:
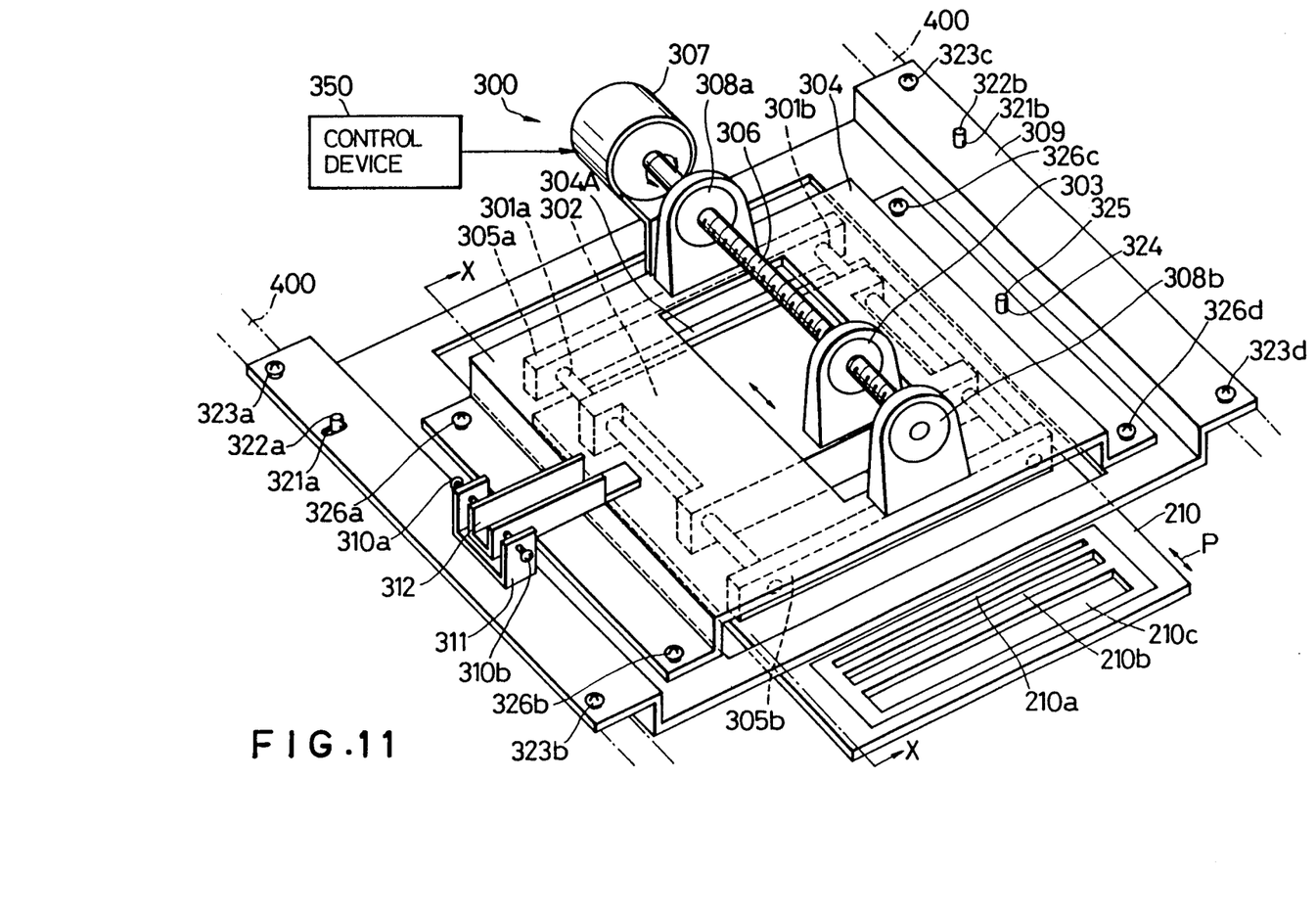
FIG. 11 is a perspective schematic view showing an embodiment of the mechanism for moving the slits which forms the essential part of the present invention.
Figure 12:
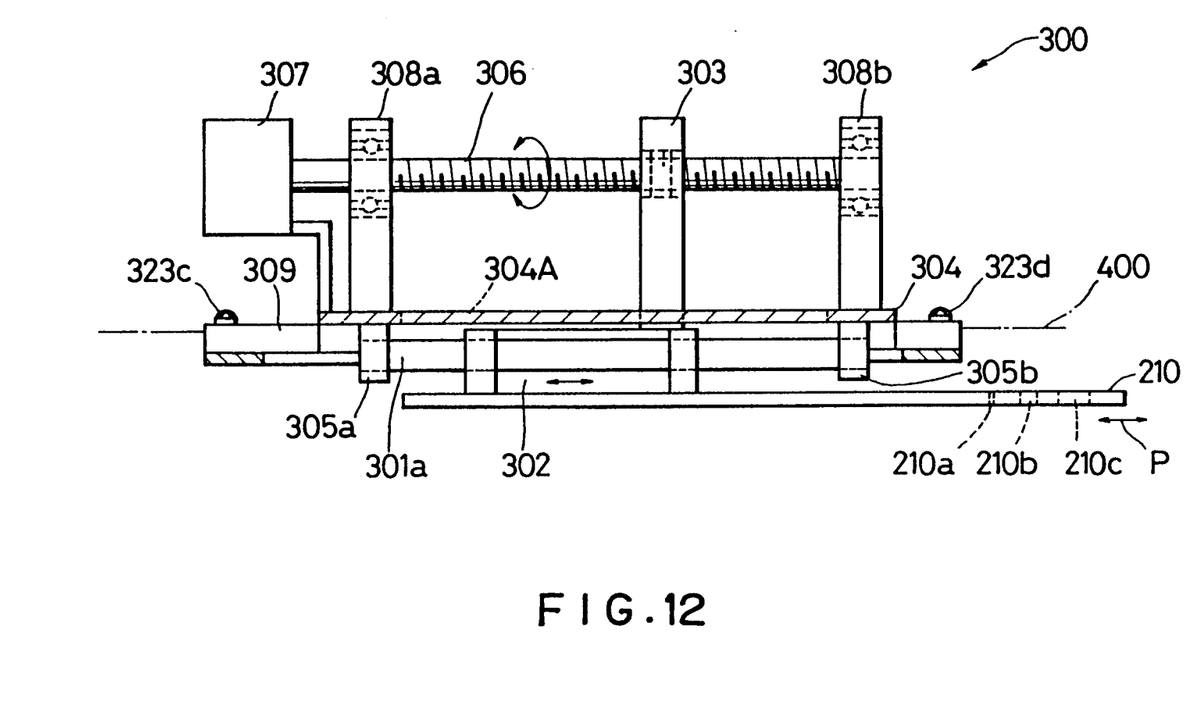
FIG. 12 is a sectional view along the line X—X in FIG. 11.

FIG. 11 is a schematic perspective view of an embodiment of the slit moving mechanism. FIG. 12 is a section thereof along the line X—X A slider 302 is fixed on the light intercepting plate 210, the slider 302 being slidable along a pair of guide rods 301a, 301b parallel to the direction p of the plate 210. In the slider 302 is fixed a nut 303 of a ball screw which is arranged parallel to the moving direction p of the light intercepting plate 210. A base plate 304 is arranged at a distance from the slider 302 on the side opposite to the side on which the nut 303 is fixed not to come in contact therewith in a manner that the nut 303 of the ball screw will protrude from an opening 304A made in the base plate 304. Both ends of the guide rods 301a, 301b are fixed to and supported by support members 305a, 305b respectively fixed on one surface of the base plate 304 (on the side of the slider 302). A pulse motor 307 which rotates the male screw 306 mated with the nut 303 of the ball screw in accordance with the command from the control device 350, and bearing 308a, 308b that support the male screw 306 are fixed on the other side of the base plate 304. The base plate 304 alone is fixed to a base plate 309 which in turn is fixed on the support frame 400. Other members (such as light intercepting plate 210, slider 302, etc.) are so arranged that they are not in contact with base the plate 309. On the base plate 309 is also fixed an adjustment means 311 for adjusting the inclination, the adjustment means being U-shaped in section and having screws 310a, 310b screwed on the sides thereof. One end of a lever 312 for adjusting the inclination is fixed to the base plate 304 at such a position that the other end of the lever 312 will be located between the screws 310a and 310b without coming in contact with the adjustment means 311.

Figure 13:
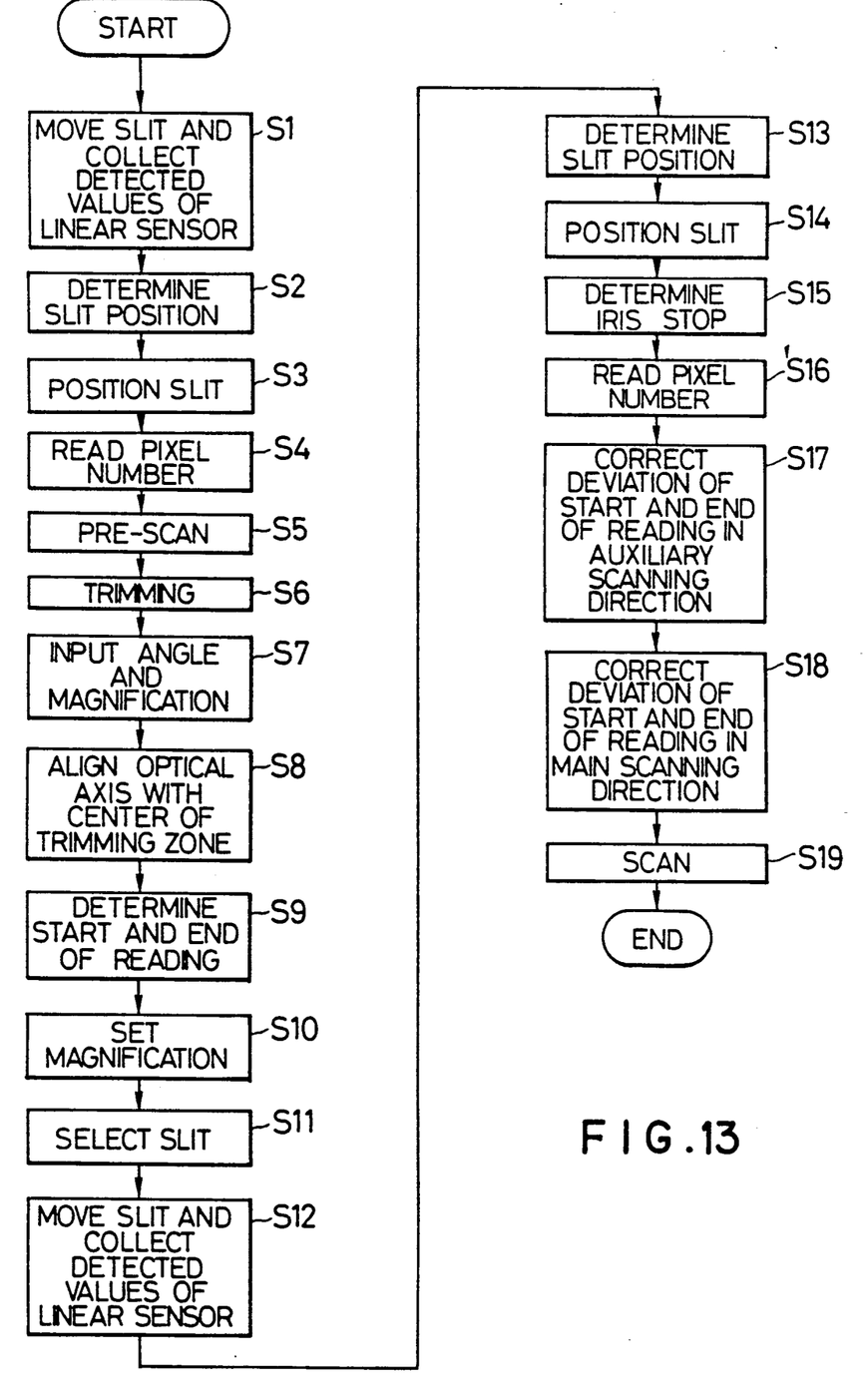
FIG. 13 is a flow chart showing the operations in the image reading apparatus of the present invention.
Figure 14:
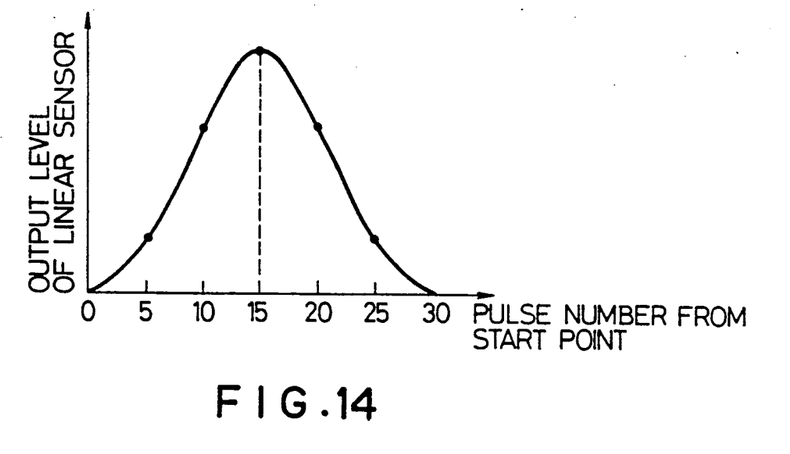
FIGS. 14 through 16 are graphs for explaining the method of determining the optimal positions of the slits in respective embodiments.
Figure 15:
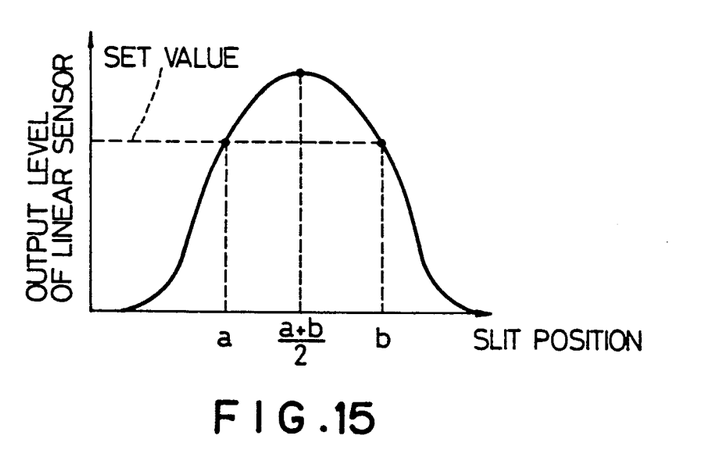
Figure 16:
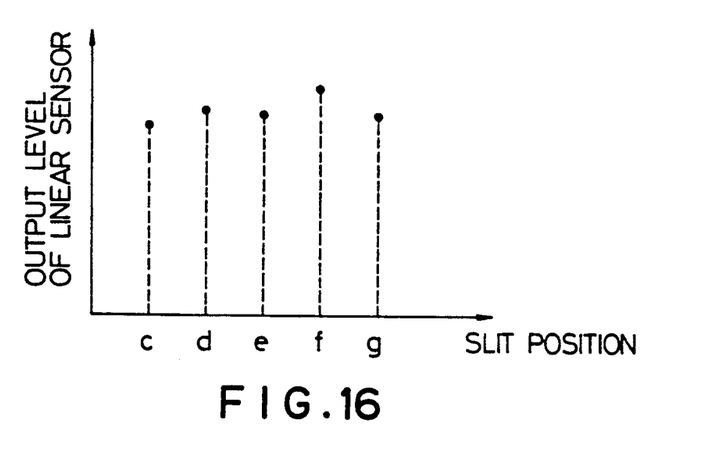

The operation of the device having the above construction will now be described referring to the flow chart shown in FIG. 13. First, positioning holes 321a, 321b on the base plate 309 are inserted with positioning pins 322a, 322b provided on the support frame 400 in order to properly position the base plate 309. The base plate 309 is fixed to the support frame 400 by means of fixing screws 323a, 323b, 323c, 323d. Then, a hole 324 perforated on the base plate 304 on which members such as the light intercepting plate 210 are mounted is engaged with a pin 325 for adjusting the inclination on the base plate 309 to tentatively position the base plate 304. The control device 350 drives a pulse motor 307 to cause the light intercepting plate 210 to move. The control device 350 also collects detected values of the lights that enter the linear sensor 102 via a predetermined one of the moving slits 210a, 210b or 210c to determine the optimal position of the slit (Steps S1 and S2). In one method for determining the optimal position, the number of pulses is counted starting from a given point (e.g. one end of the above slit) as shown in FIG. 14 and the optimal position is determined to be the point where the output signal level from the linear sensor 102 reaches the peak (in this case, 15 pulses). Alternatively as shown in FIG. 15, a predetermined output signal level of the linear sensor 102 is selected in advance as a pre-set value. This pre-set value is detected twice, in this case, at points a and b, and the intermediate or midway position (a+b)/2 between two detected points a and b is determined to be the optimal position. Or, as shown in FIG. 16, the output signal level of the linear sensor 102 is detected at its optimal design position e and output signal levels, c, d, f, g both before and after the detected optimal position are collected, and the position f at which the output signal level is highest is selected as the optimal position.

The control device 350 positions the slit at the optimal position thus determined (Step S3), and then reads the pixel number of the linear sensor 102 which corresponds to the central position of the reference scale provided on a mount table (not shown) for the transmissive original 103 (Step S4). The transmissive original 103 is prescanned for its entire area (Step S5), and is trimmed on a display device such as CRT (Step S6), and the angle and magnification are inputted to the control device 350 (Step S7). The control device 350 aligns the optical axis with the center of the trimming zone in the main scanning direction of the original at an angle designated. The control device 350 also determines the points for starting and ending the reading in the trimming zone (Steps S8 and S9). The linear sensor 102 and the focusing lens 104 are then moved to set the optical magnification of the image (Step S10), and a slit which is agreeable with the optical magnification is selected and the result is transmitted to the control device 350 (Step S11). As in the Steps S1 and S2, the control device 350 drives the pulse motor 307 to move the light intercepting plate 210 for collecting detected values of the lights for forming the image entering the linear sensor 102 via the moving slits, determines the optimal position of the slit, and moves the slit to the optical position (Steps S12, S13, S14). The base plate 304 is then fixed on the base plate 309 by the fixing screws 326a, 326b, 326c and 326d, and the iris stop is determined (Step S15). The control device 350 reads the pixel signal in the linear sensor 102 which corresponds to the center of the reference scale (Step S16).

If the strip of image lights is tilted with respect to the linear sensor, either one of the screws 310a and 310b of the adjustment means 311 for adjusting the inclination is loosened and the other is tightened, whereby the lever 312 for adjusting the inclination, the base plate 304 and the light intercepting plate 210 are rotated about the pin 325 for adjusting the inclination and the tilting of the strip of lights may be offset.

By adding the difference between the optimal position determined in the Step S2 and that determined in the Step S13 (e.g. a difference in the feed pulse from the reference position) to the positions for starting and ending the reading of the trimming zone determined by the Step S9, the control device 350 corrects deviations in the auxiliary scanning direction (Step S17). By adding the difference between the pixel number read in the Step S4 and the pixel number read in the Step S16 to the positions for starting and ending the reading of the trimming zone determined by the Step S9, the deviation in the main scanning direction can be corrected (Step S18). Finally, the original 103 is scanned (Step S19) to complete the entire process.

By going through the steps mentioned above, a clear image without blur can be obtained.

It should be noted that the control device 350 may be provided with such functions as establishing the optical magnification and selecting any one of the slits. Deviations may be corrected only in either the main or the auxiliary scanning direction.

Figure 17:
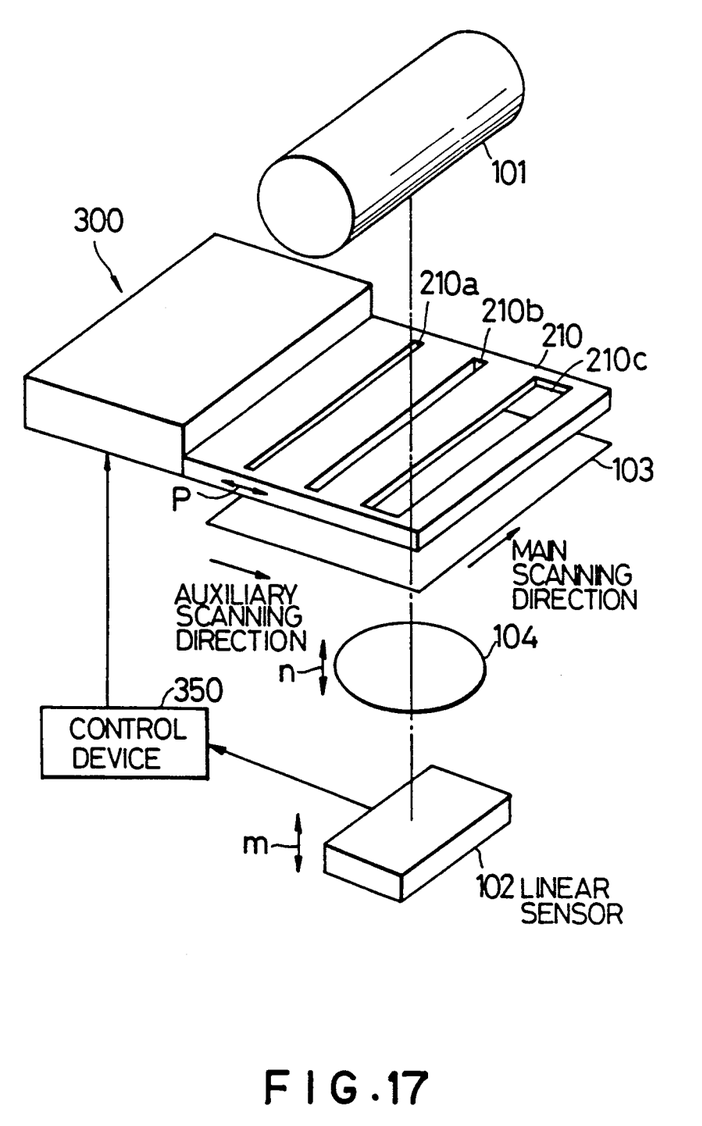
FIG. 17 is a perspective schematic view showing another embodiment of the input optical system in the image reading apparatus according to the present invention.

FIG. 17 is a perspective schematic view showing another embodiment of the input optical system in the image reading apparatus according to the present invention. The view corresponds to FIG. 10, and the same component parts are given the same reference numbers. In this embodiment, the intercepting plate 210 which includes a slit moving mechanism 300 for moving the slits is disposed above the transmissive original 103.

It is noted that the number of slits is not specifically limited, and any arbitrary number of slits which the device is capable of accomodating can be provided. The means to determine the position of the slits according to the present invention can therefore be adapted suitably to an image reading apparatus having only one slit.

It is also noted that although the copy original has been described to be a transmissive one in the foregoing embodiments, it is not specifically limited to it and copy original that are reflective may also be used. If the width of the slits is expanded, an area sensor instead of the linear sensor can also be used for reading the image.

EFFECT OF THE INVENTION

As has been described in the foregoing, the apparatus and method for reading images according to the present invention is capable of preventing deviations in the main scanning and auxiliary scanning directions even if the optical magnification is varied, preventing contour lines from appearing at the edge portions, and producing picture images with high resolution in the grey levels accurately in a short period of time.

Figure 18:
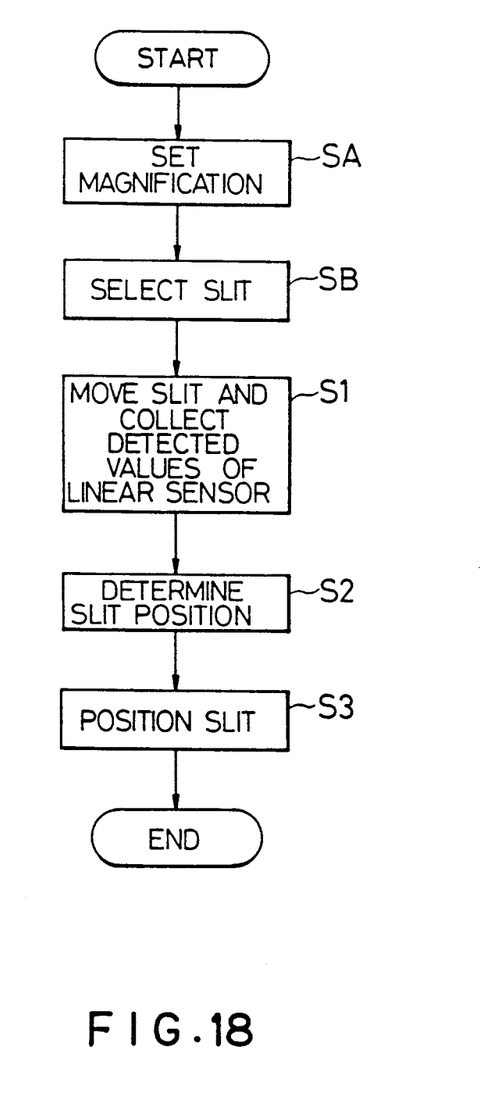
FIG. 18 is a flow chart showing the operations in the slit positioning apparatus of the present invention.

The operation of the slit positioning apparatus having the above construction will now be described referring to the flow chart shown in FIG. 18 corresponding to FIG. 13. First, positioning holes 321a, 321b on the base plate 309 are inserted with positioning pins 322a, 322b provided on the support frame 400 in order to properly position the base plate 309. The base plate 309 is fixed to the support frame 400 by means of fixing screws 323a, 323b, 323c, 323d. Then, a hole 324 performed on the base plate 304 on which members such as the light intercepting plate 210 are mounted is engaged with a pin 325 for adjusting the inclination on the base plate 309 to tentatively position the base plate 304. The control device 350 drives a pulse motor 307 to cause the light intercepting plate 210 to move. A linear sensor 102 and a focusing lens 104 are moved so as to set an optical magnification of the image (Step SA), a slit is selected so as to match with the optical magnification and commanded to a control device 350 (Step SB). The control device 350 also collects detected values of the lights that enter the linear sensor 102 via a predetermined one of the moving slits to determine the optimal position of the slit (Step S1 and S2). In one method for determining the optimal position, the number of pulses is counted starting from a given point as shown in FIG. 14 and the optimal position is determined to be the point where the output signal level from the linear sensor 102 reaches the peak. Alternatively as shown in FIG. 15, a predetermined output signal level of the linear sensor 102 is selected in advance as a pre-set value, and the intermediate position (a+b)/2 between two slits a and b is determined to be the optimal position. Or, as shown in FIG. 16, the output signal level of the linear sensor 102 at its optimal design position e and output signal levels, c, d, f, g before and after the position are collected, and the position f at which the output signal level reaches the peak is selected as the optimal position. The control device 350 positions the slit at the optimal position thus determined (Step S3). Thereafter, the base plate 304 is fixed at the base plate 309 by screws 326a, 326b, 326c and 326d and entire process is completed.

If the strip of image lights is tilted with respect to the linear sensor, either one of the screws 310a and 310b of the adjustment means 311 for adjusting the inclination is loosened and the other is tightened, whereby the lever 312 for adjusting the inclination, the base plate 304 and the light intercepting plate 210 are rotated about the pin 325 for adjusting the inclination and the tilting of the strip of lights may be offset.

By going through the steps mentioned above, the strip of lights could be entered to a suitable position of the linear sensor.

As has been described in the foregoing, the slit positioning apparatus according to the present invention is capable of preventing deviations even if the optical magnification is varied, preventing contour lines from appearing at the edge portions, and producing picture images with high resolution in the grey levels accurately in a short period of time.

It should be understood that many modifications and adaptations of the invention will become apparent to those skilled in the art and it is intended to encompass such obvious modifications and changes in the scope of the claims appended hereto.

What is claimed is:

1. A method for reading an image scanned in a first main direction and in a second auxiliary direction which is normal to the first main direction, the method comprising the steps of:

providing a reading apparatus including a light source, a movable light intercepting plate having at least one slit, and a light sensor for receiving light from the light source which passes through the at least one slit;

determining an optimal position of the slit relative to the light source by moving the movable light intercepting plate in the second auxiliary direction so that light from the light source is received by the light sensor through the at least one slit, and reading output levels of the light sensor as the movable light intercepting plate is moved;

moving the movable light intercepting plate so that the at least one slit is positioned at the determined optimal position;

determining an amount the movable light intercepting plate is moved to position the at least one slit at the optimal position; and adjusting the scanning of the image in the second auxiliary direction based on the determined amount.

2. The method as defined in claim 1, wherein said step of determining the optimal position of the at least one slit includes detecting the highest output level of the light sensor as the movable light intercepting plate is moved, and determining the optimal position of the at least one slit as that position of the movable light intercepting plate which corresponds to the highest detected output level.

3. The method as defined in claim 1, wherein said step of determining the optimal position of the at least one slit includes determining a first position of the movable light intercepting plate which corresponds to a predetermined output level of the light sensor, determining a second position of the movable light intercepting plate which also corresponds to the predetermined output level of the light sensor, the first and second positions being different from each other, and determining the optimal position of the at least one slit as that position of the movable light intercepting plate which is midway between the determined first and second positions.

4. The method as defined in claim 1, wherein said providing step includes providing a linear sensor as the light sensor and disposing the linear sensor in parallel with the slit.

5. The method as defined in claim 1, wherein said step of determining the optimal position of the at least one slit includes detecting an output level of the light sensor at a predetermined position of the movable light intercepting plate, the predetermined position corresponding to a predetermined optimal design position, detecting output levels of the light sensor as the movable light intercepting plate is moved to positions upstream and downstream from the predetermined optimal position, and determining the optimal position of the at least one slit as that position of the movable light intercepting plate which corresponds to the highest output level of all of the detected output levels.

6. A method for reading an image scanned in a first main direction and in a second auxiliary direction which is normal to the first main direction, the method comprising the steps of:
   (a) providing a reading apparatus including a light source, a movable light intercepting plate having a plurality of slits each having a different width, and a light sensor for receiving light from the light source which passes through one of the slits;
   (b) determining an optimal position of one of the slits relative to the light source by moving the movable light intercepting plate in the second auxiliary direction so that light from said light source is received by said light sensor through the one slit, and reading output levels of the light sensor as the movable light intercepting plate is moved;
   (c) moving the movable light intercepting plate to the determined optimal position of the one slit;
   (d) reading, after step (c), a predetermined pixel number of the light sensor;
   (e) selecting a desired magnification for the image;
   (f) selecting one of the slits in accordance with the selected desired magnification;
   (g) determining an optimal position of the selected slit by moving the movable light intercepting plate such that light passes through the selected slit and reading output levels of the light sensor as said movable light intercepting plate is moved;
   (h) moving the movable light intercepting plate so that the selected slit is positioned at its determined optimal position;
   (i) reading, after step (h), said predetermined pixel number of the light sensor; and
   (j) adjusting the scanning of the image in the first main scanning direction in accordance with a difference between values of the predetermined light sensor pixel numbers read in steps (d) and (i), and adjusting the scanning of the image in the second auxiliary direction in accordance with a difference between the optimal positions determined in steps (b) and (g).

7. The method as defined in claim 6, wherein said providing step includes providing a linear sensor as the light sensor, and disposing the linear sensor in parallel with the plurality of slits.

8. The method as defined in claim 6, wherein said providing step includes providing means for fixing a lens, and wherein the method further comprises the step of fixing the lens after the selected slit of the movable light intercepting plate is moved to the optimal position in step (h).

9. The method as defined in claim 6, wherein said determining step (b) includes detecting a highest output level of the light sensor as the movable light intercepting plate is moved, and determining the optimal position of the one slit as that position of the movable light intercepting plate which corresponds to the highest detected output level.

10. The method as defined in claim 6, wherein said determining step (b) includes determining a first position of the movable light intercepting plate which corresponds to a predetermined output level of the light sensor, determining a second position of the movable light intercepting plate which also corresponds to the predetermined output level of the light sensor, the first and second positions being different from each other, and determining the optimal position of the one slit as that position which is midway between the determined first and second positions.

11. The method as defined in claim 6, wherein said determining step (b) includes detecting an output level of the light sensor at a predetermined position of the movable light intercepting plate which corresponds to a predetermined optimal design position, detecting output levels of the light sensor as the movable light intercepting plate is moved to positions upstream and downstream from the predetermined optimal position, and determining the optimal position of the movable light intercepting plate as that position which corresponds to the highest output level of all of the detected output levels.

12. The method as defined in claim 6, wherein said determining step (g) includes detecting a highest output level of the light sensor as the movable light intercepting plate is moved, and determining the optimal position of the selected slit as that position of the movable light intercepting plate which corresponds to the highest detected output level.

13. The method as defined in claim 6, wherein said determining step (g) includes determining a first position of the movable light intercepting plate which corresponds to a predetermined output level of the light sensor, determining a second position of the movable light intercepting plate which also corresponds to the predetermined output level of the light sensor, the first and second positions being different from each other, and determining the optimal position of the selected slit as that position of the movable light intercepting which is midway between the determined first and second positions.

14. The method as defined in claim 6, wherein said determining step (g) includes detecting an output level of the light sensor at a predetermined position of the movable light intercepting plate which corresponds to a predetermined set optimal design position, detecting output levels of the light sensor as the movable light intercepting plate is moved to positions upstream and downstream from the predetermined set optimal position, and determining the optimal position of the selected slit as that position of the movable light intercepting plate which corresponds to the highest output level of all of the detected output levels.

15. An apparatus for reading an image scanned in a first main direction and in a second auxiliary direction which is normal to the first main direction, the apparatus comprising:
- a light source for emitting light;
- a movable light intercepting plate having at least one slit;
- a light sensor disposed to receive light from said light source which passes through the at least one slit; and
- control means coupled to said movable light intercepting plate and to said light sensor, said control means determining an optimal position of the at least one slit relative to said light source by moving said movable light intercepting plate in the second auxiliary direction so that said light sensor receives light emitted from said light source through the one slit, and reading output levels of said light sensor as said movable light intercepting plate is moved, said control means being operable for moving said movable light intercepting plate so that the at least one slit is positioned at the determined optimal position, and for adjusting the scanning of the image in the second auxiliary direction based on an amount said movable light intercepting plate is moved to position the at least one slit at the optimal position.

16. The apparatus as defined in claim 15, wherein said movable light intercepting plate includes a plurality of slits each having a different width.

17. The apparatus as defined in claim 15, wherein said light sensor is a linear light sensor.

18. An apparatus for reading an image scanned in a first main direction and in a second auxiliary direction which is normal to the first main direction, the apparatus comprising:
- a light source for emitting light;
- a movable light intercepting plate including a plurality of slits each having a different width;
- moving means for moving said movable light intercepting plate;
- a light sensor for receiving light which is emitted from said light source and which passes through one of said slits; and
- control means, coupled to said moving means and said light sensor, for controlling said moving means and for reading output levels of said light source, said control means having input means for receiving information representing a desired magnification for the image, said control means operable for: determining an optimal position of one of said slits relative to said light source by controlling said moving means to move said movable light intercepting plate in the second auxiliary direction so that said light sensor receives light emitted from said light source through the one slit, reading output levels of said light source as said movable light intercepting plate is moved, controlling said moving means to move said movable light intercepting plate so that the one slit is positioned at the determined optimal position, reading and storing a predetermined pixel number of said movable light source after said light intercepting plate is moved to the optimal position, selecting one of said slits in accordance with inputted information representing a desired image magnification, determining an optimal position of said selected slit relative to said light source by controlling said moving means to move said movable intercepting plate in the second auxiliary direction such that light emitted from said light source is received by said light sensor through said selected slit, reading output levels of said light source as said movable light intercepting plate is moved, controlling said moving means to move said movable light intercepting plate to the determined optimal position of the selected slit, again reading and storing the predetermined pixel number of said light source, calculating a difference between the stored predetermined pixel numbers, and adjusting the scanning of the image in the first main direction in accordance with the calculated difference.

19. The apparatus as defined in claim 18, wherein said light source is a linear light source, and wherein said moving means includes a pulse motor, and said control means is connected to supply pulse signals to said pulse motor.

20. The apparatus as defined in claim 18, wherein said control means is also operable for calculating a difference between an amount said movable light intercepting plate is moved to position the one slit to its optimal position and an amount said movable light intercepting plate is moved to position the selected slit to its optimal position, and adjusting the scanning of the image in the second auxiliary direction in accordance with the calculated difference.

* * * * *